Patented Dec. 3, 1940

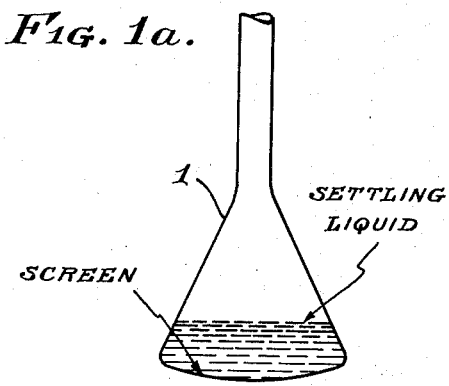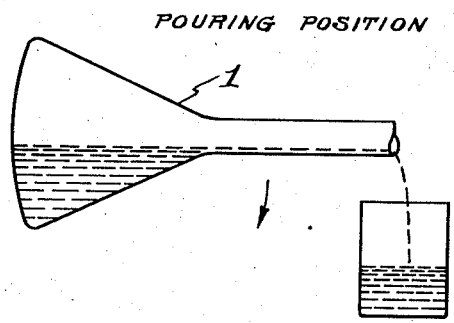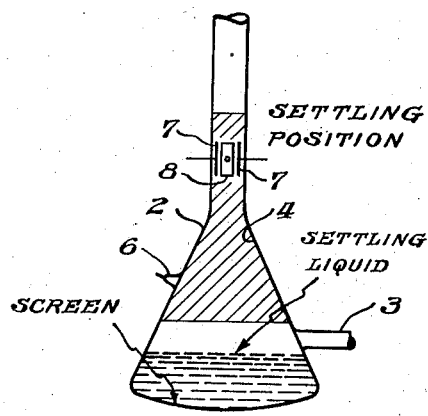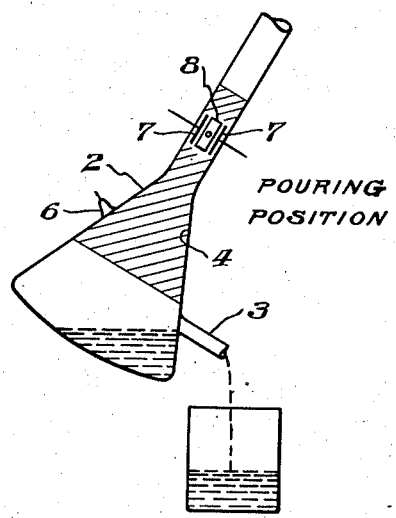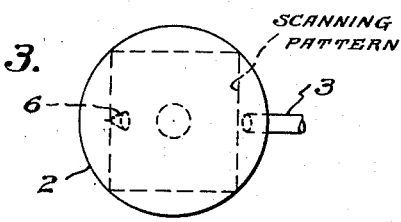

2,223,830

UNITED STATES PATENT OFFICE 2,223,830

FLUORESCENT SCREEN

Humboldt W. Leverenz, Collingswood, N. J., assignor to Radio Corporation of America, a corporation of Delaware Application July 30, 1938, Serial No. 222,085

3 Claims. (Cl. 250—27.5)

My invention relates to electric discharge tubes particularly to a method of and means for making fluorescent screens.

In most cathode ray tubes having fluorescent screens therein, the fluorescent screen is formed by coating the end of the tube envelope opposite the electron gun with fluorescent material. This may be done by spraying or settling, for example. The settling method, specific examples of which are described in Batchelor Patent 2,062,858 and in my Patent 2,108,683, has several advantages over other methods. It is especially advantageous if the fluorescent material is expensive, since very little fluorescent material is lost during the settling process.

It is an object of my invention to provide an improved method of and means for making fluorescent screens or the like by the settling process.

More specifically, an object of my invention is to eliminate or reduce "avalanching" of the fluorescent material during the making of the fluorescent screen whereby failures of the settling process are practically eliminated.

In accordance with my invention, a tube is sealed into the side of the cathode ray tube envelope near the screen end. Most of the settling liquid is removed through this tube without tilting the cathode ray tube envelope through an angle great enough to cause "avalanching" of the fluorescent material.

The invention will be better understood by referring to the accompanying drawing in which—

Figures 1a and 1b illustrate the settling process previously employed,

Figures 2a and 2b illustrate the method of and means for making a fluorescent screen in accordance with the present invention, and Figure 3 is an end view of the cathode ray tube shown in Figs. 2a and 2b.

Referring to Fig. 1a, there is shown a cathode ray tube envelope 1 upon the end of which is to be formed a fluorescent screen as indicated by the legend. The fluorescent material, such as willemite, is mixed with a suitable settling liquid such as water, then poured into the envelope and allowed to settle while the envelope is in the position shown in Fig. 1a.

After the screen material has settled, the envelope is tilted to pour out the settling liquid. As shown in Fig. 1b, the screen assumes a vertical position whereby considerable care must be taken to prevent "avalanching" of the material as a slight jar will cause it to slide towards the lower side of the envelope.

In accordance with my invention, as illustrated in Figs. 2a and 2b, the cathode ray tube envelope indicated at 2 has a tube 3 sealed into the side of the envelope near the end which is to receive the fluorescent material.

Before the fluorescent screen is made, it is desirable to form on the inner surface of the envelope 2 the usual conducting coating 4 which functions as the second anode, electrical connection to the coating 4 being made through a contact terminal 6, and also to blacken the coating 4 to reduce the reflections. The blackening may be accomplished by filling the envelope to the desired level with aquadag, or by employing any other suitable process.

If electrostatic deflection of the cathode ray is employed, the deflecting plates 7 and 8 are preferably positioned as indicated with respect to the tube 3 for reasons which will be explained later in connection with Fig. 3.

As described above, the fluorescent materials while in suspension in a settling liquid is poured into the envelope 2 and allowed to settle, the envelope being in the vertical position as shown in Fig. 2a during this period.

After the fluorescent material has settled, the envelope is tilted as shown in Fig. 2b whereby the settling liquid runs out of the tube 3. It will be evident that nearly all of the settling liquid can be removed in this way without tilting the bottom of the envelope so close to the vertical that there is danger of the material "avalanching."

If desired, a tube may be inserted through the tube 3 and most of the settling liquid siphoned or aspirated off before the envelope 2 is tilted for pouring off the last of the liquid.

By employing the process shown in Figs. 2a and 2b, there is the further advantage that the fluorescent material which may remain in the settling liquid does not deposit on the blackened coating 4 during the pouring off step. This has been one objection to the process shown in Figs. 1a and 1b, since stray electrons would cause any fluorescent material on the coating 4 to fluoresce and cause haze on the fluorescent screen.

As indicated in Fig. 3, the tube 3 preferably is positioned opposite a side of the scanning pattern so that if, in pouring off the last of the settling liquid, there is "avalanching" near the edge of the screen, it will occur on a portion of the screen that is not scanned.

It should be understood that my invention is not limited to cathode ray tubes but applies to any electric discharge tube in which a fluorescent screen is utilized. Also, the invention is not limited to the making of fluorescent screens for electric discharge tubes having envelopes of the conical shape illustrated, although it is especially useful when the envelope is conical as the conical shape require that the envelope be tilted through a large angle to remove the settling liquid.

I claim as my invention:

1. In the production of an electric discharge device having an envelope which has a wall portion and which has a tube sealed into the envelope near the wall portion, the method of forming a fluorescent screen on said wall portion which comprises settling fluorescent material from suspension in a liquid upon said wall portion and, after said material has settled, pouring off at least part of said liquid through said tube.

2. The process of forming a fluorescent screen on one end of an electric discharge tube envelope which comprises sealing a tube into the side of said envelope near said one end, settling fluorescent material from suspension in a liquid upon said one end and, after said material has settled, pouring off at least part of said liquid through said side tube.

3. In the manufacture of a cathode ray tube wherein the tube comprises an envelope having a gun end and a screen end, the method which comprises first sealing a tube into the side of said envelope near said screen end, blackening the inner surface of said envelope from a point above said side tube to a point in the region of said gun end, next settling fluorescent material from suspension in a liquid upon said screen end, after said material has settled, pouring off at least part of said liquid through said side tube whereby "avalanching" of said material is reduced and whereby none of said material is deposited upon said blackened surface.

HUMBOLDT W. LEVERENZ.